3,219,546
SEPARATION OF ALKYL MONO-BROMIDES FROM HYDROCARBON BY EXTRACTIVE DISTILLATION
Loyd W. Fannin, Creve Coeur, and Charles H. Middlebrooks, St. Louis, Mo., assignors to Monsanto Company, a corporation of Delaware
Filed Apr. 25, 1963, Ser. No. 275,590
16 Claims. (Cl. 202—39.5)

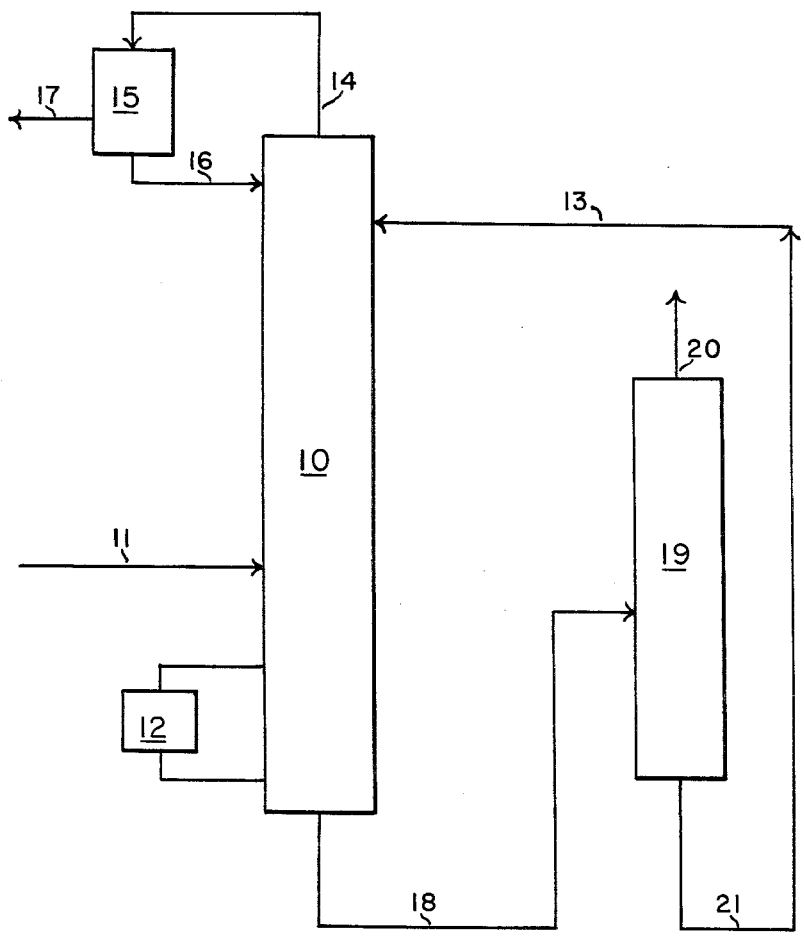

The present invention relates to the separation of organic compounds by extractive distillation. More particularly, the present invention relates to a process for the separation of alkyl halides from hydrocarbons by extractive distillation and to the solvent useful therein.

It is an object of the present invention to provide an extractive distillation process for the separation of organic compounds. Another object of the present invention is to provide an extractive distillation process for the separation of alkyl halides from hydrocarbons. A further object of the present invention is to provide a solvent for the separation of alkyl halides from hydrocarbons by extractive distillation. Additional objects of the present invention will become apparent from the following description of the invention herein disclosed.

In fulfillment of these and other objects, it has now been found that alkyl halides in admixture with hydrocarbons which are difficultly separable therefrom can be effectively separated from such hydrocarbons by extractively distilling said mixture in the presence of a dialkylamide solvent. This may be accomplished by placing a dialkylamide together with a mixture of an alkyl halide and a hydrocarbon which is difficultly separable from said alkyl halide, into a distillation stillpot and subjecting said mixture to distillation conditions such as to produce an overhead distillate consisting of hydrocarbons substantially free of alkyl halides. In a preferred embodiment of the present invention a feed mixture comprising alkyl halides and hydrocarbons which are difficultly separable therefrom can be effectively separated by an extractive distillation process which comprises continuously introducing the feed mixture into an intermediate section of a fractionating column, continuously introducing a dialkylamide solvent into the fractionating column at a point above the point of introduction of the feed mixture, so that the solvent flows countercurrent to and intimately contacts the ascending vapors of the feed mixture, withdrawing overhead hydrocarbons substantially free of alkyl halides and removing from the bottom section of said column a solution of alkyl halide contained in said solvent.

The present invention is further illustrated by the accompanying schematic diagram of an embodiment of the invention. Referring to the drawing, a feed mixture comprising alkyl halides and hydrocarbons which are difficultly separable therefrom is introduced into a fractionating column 10 through line 11. Liquids are vaporized in the lower part of column 10 by heat supplied to a reboiler 12. The solvent is introduced into the column in the liquid phase through line 13 which is located at a point in the fractionating column 10 above line 11. The solvent flows downward through the column 10, countercurrently contacting upwardly flowing vapors of the feed mixture. The unabsorbed portion of the feed mixture is removed from the fractionating column 10 by means of line 14 and passes through condenser 15 in which it is liquefied. A portion of the liquefied material is returned to the column 10 as reflux through line 16 and a portion comprising hydrocarbons substantially free of alkyl halides recovered through line 17. The solvent enriched with absorbed alkyl halides is removed from column 10 by means of line 18 and passed into distillation column 19 in which the alkyl halides are separated from the solvent. The alkyl halides exit the distillation column 19 by line 20 and the solvent passes from distillation column 19 and is returned to the fractionating column 10 by means of lines 21 and 13.

To further describe and to illustrate the present invention, the following examples are presented. These examples are in no way to be construed as limiting to the present invention.

*Example I*

A 1-inch diameter Oldershaw fractionating column of approximately 45 trays was employed in separating an alkyl halide-hydrocarbon mixture according to the present invention. The alkyl halide-hydrocarbon feed mixture was comprised of 18% by weight 2-bromopropane (B.P. 60° C.) and 8.2% by weight of a mixture of straight-chain and methyl substituted hexenes (B.P. 58–68° C.). The feed mixture was introduced into the Oldershaw column at a point 10 trays from the bottom of the column at a rate of 0.36 liter per hour. Dimethylformamide was introduced into the fractionating column at a point 40 trays from the bottom of the column at a rate such as to cause a 3:1 solvent to feed ratio. The column was operated at a 1:1 reflux ratio. Distillate obtained overhead contained only the hexenes. The solvent-bromopropane mixture was continuously taken from the bottom of the column and subjected to a flash distillation from which relatively pure bromopropanes were obtained.

*Example II*

The procedure described in Example I is repeated with the exception that dimethylacetamide is used as the solvent. A hydrocarbon distillate substantially free of bromopropane is obtained as overhead from the Oldershaw column and bromopropanes substantially free of hydrocarbons are obtained from the flash distillation.

*Example III*

The procedure described in Example I is repeated with the exception that dimethylpropionamide is used as the solvent. A hydrocarbon distillate substantially free of bromopropane is obtained as overhead from the Oldershaw column and bromopropanes substantially free of hydrocarbons are obtained from the flash distillation.

*Example IV*

The procedure described in Example I is repeated with the exception that the alkyl halide-hydrocarbon mixture is comprised of 2-bromohexane and 1-nonene in a volume ratio of 1:9 and the solvent is diethylformamide. The hydrocarbon distillate obtained from the Oldershaw column is substantially free of 2-bromohexane and the distillate from the flash distillation contains 2-bromohexane substantially free of 1-nonene.

The solvents within the scope of the present invention are the N,N-dialkylamides. These compounds have the formula:

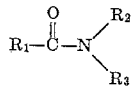

wherein $R_1$ is an alkyl hydrocarbon radical of 1 to 4 carbon atoms and $R_2$ and $R_3$ are alkyl hydrocarbon radicals of 1 to 5 carbon atoms. The alkyl hydrocarbon radicals may be either straight or branched-chain, but preferably are straight-chain. Several non-limiting examples of the N,N-dialkylamides are dimethylformamide, dimethylacetamide, dimethylpropionamide, dimethylbutyramide, diethylformamide, diethylacetamide, diethylpropionamide, diethylbutyramide, methylethylformamide, methylethylpropionamide, dipropylacetamide, ethylpentylformamide, dibutylacetamide, ethylbutylpropionamide, dibutylpropionamide, methylpentylacetamide, and the like. The preferred N,N-dialkylamides are those in which $R_1$ is an alkyl hydrocarbon radical of from 1 to 2 carbon atoms and $R_2$ and $R_3$ are alkyl hydrocarbon radicals of 1 to 3 carbon atoms and wherein $R_2$ and $R_3$ are the same. The most preferred solvents of the present invention are dimethylformamide, diethylformamide and dimethylacetamide.

The dialkylamides may be used singly or in combination one with the other. Also, they may be used in conjunction with a great number of auxiliary solvents such as co-solvents, modifying solvents, or anti-solvents and when so used, the dialkylamides would be present in an amount of from 50 to 99% by weight.

Any conventional distillation equipment may be used in practicing the invention disclosed herein. The present invention may be carried out either by batch distillation or continuous distillation methods. Any conventional fractionating column may be used. The column may be a packed column or it may be one equipped with perforated plates, bubble trays, or a system of baffles. The number of theoretical plates in the fractionating column will depend upon the efficiency of separation desired, the precise composition of the feed mixture, the quantity of solvent, the reflux ratio, and other related factors well known to those skilled in the art. The preferred fractionating column is one providing for countercurrent liquid vapor contact under reboiling and refluxing conditions and, generally, will have a theoretical plate efficiency of 25 to 35.

In practicing the present invention according to its preferred mode of practice, the feed mixture is introduced into the fractionating column at a point approximate to or below the mid point of the fractionating column while the solvent is introduced above the entry point of the feed mixture. The solvent most often is introduced at a point at or near the top of the column. Generally, it will be preferred that the feed mixture be introduced at a point in the fractionating column of from one-fifth to one-third of the height of the column from the bottom of the column and that the solvent be introduced at a point no greater than one-third of the height of the column from the top of the column.

The quantity of solvent required to be introduced continuously into the column in order to accomplish the desired separation will vary over relatively wide limits depending upon the efficiency of the separation desired. Generally, no less than 1 part by volume of solvent per part by volume of feed mixture will be used. The quantity of solvent may range as high as 10 to 20 volumes per volume of feed mixture. As dilution of the internal influx becomes infinite, separation becomes sharper but operating efficiency is lowered considerably because of the relatively small quantity of feed mixture being processed as infinite reflux is approached. Too large an excess of solvent is, therefore to be avoided.

The reflux ratio in which the column is operated will vary according to the theoretical plate efficiency of the column, the solvent to feed ratio, composition of the feed mixture and separation desired. Generally, however, reflux ratios of 0.1:1 to 20:1 will suffice. It is preferred, however, that the reflux ratio be within the range of 0.5:1 to 5:1.

The present extractive-distillation process may be carried out at atmospheric pressure or at subatmospheric pressures as well as at superatmospheric pressures. Generally, pressures within the range of from atmospheric up to 5 to 100 p.s.i.a. will be used. It will generally be preferred, however, that the pressure be at or near atmospheric pressure, i.e., 1 to 10 p.s.i.g.

The feed mixtures which may be separated according to the present invention are organic mixtures comprised of alkyl halides and hydrocarbons which are difficultly separable therefrom. The hydrocarbons may be aromatic or aliphatic, but preferably are aliphatic. If aromatic, the hydrocarbons may be cyclic or non-cyclic, saturated or unsaturated, straight or branched chain. The present invention is most useful in separating mixtures comprised of alkyl halides having 2 to 10 carbon atoms and unsaturated aliphatic hydrocarbons, which mixtures are difficultly separable by distillation. The alkyl group of the alkyl halides is either a straight chain or a branched chain alkyl group. A particularly preferred utility for the present invention is in the separation of mixtures of alkyl mono-halides, particularly alkyl mono-bromides, having 2 to 10 carbon atoms and mono-olefin hydrocarbons which mixtures are difficultly separable by distillation.

In choosing the proper solvent for affecting a particular separation in accordance with the present invention, it is necessary to consider the boiling points of the solvent and of the alkyl halides and hydrocarbons in the feed mixture to be separated. The solvent chosen must, of course, have a higher boiling point than either of the organic compounds in the mixture to be separated.

As previously pointed out, the alkyl halides are absorbed by the dialkylamide solvent and leave the extractive distillation unit as a solution with the solvent. The alkyl halides are readily recovered from the solvent by a simple flash distillation, the alkyl halides being recovered as overhead distillate. Any conventional distillation equipment may be utilized for affecting the recovery of the alkyl halides from the dialkylamide solvent. After the alkyl halides are recovered from the solvent, the solvent may then be recycled or reused in further extractive distillation.

What is claimed is:

1. A process for the separation of mixtures comprising alkyl monobromides and hydrocarbons which are difficulty separable therefrom by distillation, said process comprising subjecting such mixtures to extractive distillation in the presence of an N, N-dialkylamide, withdrawing overhead hydrocarbons essentially free of alkyl monobromides.

2. The process of claim 1 wherein the volume ratio of solvent to feed is at least 1:1.

3. The process of claim 1 wherein the N, N-dialkylamide is one having the formula:

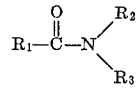

wherein $R_1$ is an alkyl hydrocarbon radical of 1 to 4 carbon atoms and $R_2$ and $R_3$ are alkyl hydrocarbon radicals of 1 to 5 carbon atoms.

4. The process of claim 3 wherein $R_1$ is an alkyl hydrocarbon radical of 1 to 2 carbon atoms and $R_2$ and $R_3$ are alkyl hydrocarbon radicals of 1 to 3 carbon atoms and wherein $R_2$ and $R^3$ are the same.

5. The process of claim 1 wherein the hydrocarbons are mono-olefin hydrocarbons.

6. The process of claim 1 wherein the alkyl monobromides are of 2 to 10 carbon atoms.

7. The process of claim 1 wherein the solvent is dimethylformamide.

8. The process of claim 1 wherein the solvent is dimethylacetamide.

9. A process for the separation of mixtures comprising alkyl monobromides and hydrocarbons which are difficulty separable therefrom, said process comprising continuously introducing said mixture into an intermediate section of a fractionating column, continuously introducing a solvent into the fractionating column at a point above the point of introduction of said mixture so that the solvent flows countercurrent to and intimately contacts the ascending vapors of the mixture, withdrawing overhead hydrocarbons substantially free of alkyl monobromides and removing from the bottom section of said column a solution of alkyl monobromides and solvent, said solvent introduced into said fractionating column being an N, N-dialkylamide.

10. The process of claim 9 wherein the volume ratio of solvent to feed is at least 1:1.

11. The process of claim 9 wherein the N, N-dialkylamide is one having the formula:

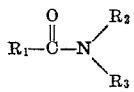

wherein $R_1$ is an alkyl hydrocarbon radical of 1 to 4 carbon atoms and $R_2$ and $R_3$ are alkyl hydrocarbon radicals of 1 to 5 carbon atoms.

12. The process of claim 11 wherein the $R_1$ is an alkyl hydrocarbon radical of 1 to 2 carbon atoms and $R_2$ and $R_3$ are alkyl hydrocarbon radicals of 1 to 3 carbon atoms and wherein $R_2$ and $R_3$ are the same.

13. The process of claim 9 wherein the hydrocarbons are mono-olefin hydrocarbons.

14. The process of claim 9 wherein the alkyl monobromides are of 2 to 10 carbon atoms.

15. The process of claim 1 wherein the solvent is dimethylformamide.

16. The process of claim 1 wherein the solvent is dimethylacetamide.

References Cited by the Examiner
UNITED STATES PATENTS

| | | | |
|---|---|---|---|
| 2,386,927 | 10/1945 | Boyd | 202—39.5 |
| 2,531,361 | 11/1950 | Padgitt | 202—39.5 |
| 2,879,310 | 3/1959 | Eby et al. | 260—654 |
| 2,908,730 | 10/1959 | Binning et al. | 260—654 |
| 2,908,731 | 10/1959 | Koble. | |
| 2,993,841 | 7/1961 | Sarno | 202—39.5 |

NORMAN YUDKOFF, *Primary Examiner.*